Aug. 1, 1961  L. D. KLEISS  2,994,646
PROCESS CONTROL SYSTEM
Filed July 7, 1958  3 Sheets-Sheet 1

INVENTOR.
L. D. KLEISS
BY Hudson & Young
ATTORNEYS

Aug. 1, 1961 L. D. KLEISS 2,994,646
PROCESS CONTROL SYSTEM
Filed July 7, 1958 3 Sheets-Sheet 2

FIG. 2

INVENTOR.
L. D. KLEISS
BY Hudson & Young
ATTORNEYS

Aug. 1, 1961  L. D. KLEISS  2,994,646
PROCESS CONTROL SYSTEM
Filed July 7, 1958  3 Sheets-Sheet 3

INVENTOR.
L. D. KLEISS
BY Hudson & Young
ATTORNEYS

United States Patent Office 2,994,646
Patented Aug. 1, 1961

2,994,646
PROCESS CONTROL SYSTEM
Louis D. Kleiss, Borger, Tex., assignor to Phillips Petroleum Company, a corporation of Delaware
Filed July 7, 1958, Ser. No. 746,768
11 Claims. (Cl. 202—160)

This invention relates to apparatus for controlling fluid separation processes in an automatic manner.

In various chemical and petroleum operations there is a need to separate the constituents of fluid mixtures. This is often accomplished by the use of fractionation columns, reboiling absorbers, extraction columns and the like. Various automatic control systems for such separating means have been developed in recent years to improve the efficiency of the separations. Many of these control systems have been based on analyses of sample streams removed from the separating means. These analyses have been made by optical instruments such as infrared analyzer, ultraviolet analyzers, differential refractometers and the like. Analyzers of this type measure some property of the sample which can be correlated with the composition thereof.

In order to obtain even more accurate analyses, instruments such as mass spectrometers and chromatographic analyzers have recently been developed. Elution chromatography is particularly useful as an analysis procedure because information is provided which is a direct function of individual constituents of a fluid mixture being analyzed. In elution chromatography, a sample of the material to be analyzed is introduced into a column which contains a material that selectively absorbs or adsorbs the constituents of the sample. A carrier gas is directed into the column so as to tend to force the sample material therethrough. The material in the column attempts to hold the constituents of the sample, whereas the carrier gas tends to pull them on through. This results in the several constituents of the fluid mixture traveling through the column at different rates of speed, depending on their affinities for the packing material. Individual constituents of the fluid mixture thus appear in the column effluent at spaced time intervals. It is common practice to detect these constituents by means of a thermal conductivity analyzer which compares the thermal conductivity of the effluent gas with the thermal conductivity of the carrier gas directed to the column.

While elution chromatographic analyzers are capable of providing accurate information regarding the composition of fluid mixtures, the output signal is not continuous because a certain amount of time is required to separate and analyze each sample. Thus, the output signal from such an analyzer cannot be employed for control purposes without some type of auxiliary equipment which is capable of retaining a given output signal until the following cycle. However, any control system which is based upon such a holding device tends to cause fluctuations in the operation of the process because of abrupt changes which may occur between individual analyses.

In accordance with the present invention, an improved process control system is provided which eliminates the difficulty previously encountered in attempting to use batch-type analyzers for continuous control purposes. A second analyzer is provided which establishes a continuous output signal that is representative of the composition of the sample stream directed to the first batch-type analyzer. The output signal from this continuous second analyzer is combined with the output signal of the first analyzer in such a manner that abrupt changes in the final control signal are avoided. Thus, a smooth signal for control processes is provided.

Accordingly, it is an object of this invention to provide novel apparatus for controlling fluid separating means in an automatic manner.

Another object is to provide a process control system utilizing a chromatographic analyzer and a second analyzer in combination so as to provide a smooth output control signal.

A further object is to provide a procedure for modifying the output of a first process analyzer by the output of a second analyzer.

Other objects, advantages and features of this invention should become apparent from the following detailed description which is taken in conjunction with the accompanying drawing in which:

FIGURE 2 is a schematic circuit drawing of a first embodiment of the control system of this invention.

Figure 1:
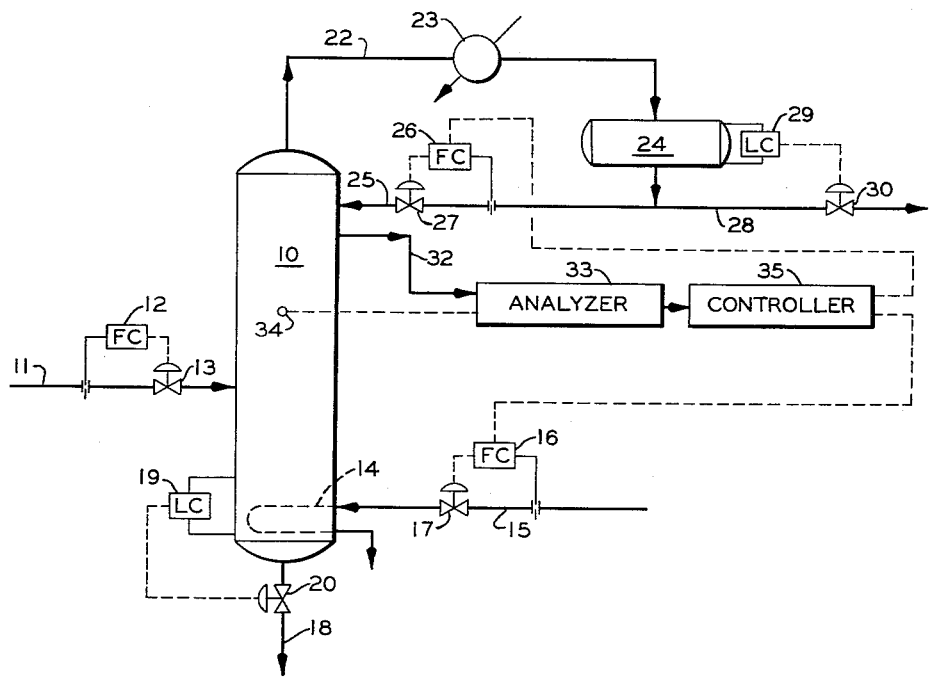
FIGURE 1 is a schematic representation of a fractionation system having the process controller of this invention associated therewith.

Referring now to the drawing in detail and to FIGURE 1 in particular, there is shown a conventional fractionation column 10. A fluid stream to be separated is introduced into column 10 through a conduit 11 at a predetermined rate which is maintained by a flow controller 12 that regulates a valve 13. Heat is supplied to the lower region of column 10 by means of a heating coil 14 which is disposed therein. Steam, or other heating fluid, is supplied to coil 14 by means of a conduit 15 which has a flow controller 16 associated therewith to regulate a valve 17. The higher boiling constituents of the feed mixture are removed from the bottom of column 10 through a conduit 18. The rate of flow through conduit 18 is regulated by liquid level controller 19 which adjusts a valve 20 to maintain a predetermined liquid level in the lower region of column 10.

The lower boiling constituents of the fluid mixture are removed from the top of column 10 through a conduit 22 which communicates through a cooler 23 with an accumulator 24. A portion of the condensed liquid in accumulator 24 is returned to column 10 as reflux through a conduit 25. A predetermined rate of flow is maintained through conduit 25 by means of a flow controller 26 which regulates a valve 27. The remainder of the liquid from accumulator 24 is removed through a conduit 28 as the overhead product stream. The rate of flow through conduit 28 is regulated by liquid level controller 29 which adjusts a valve 30 so as to maintain a predetermined liquid level in accumulator 24.

A sample of the fluid mixture in column 10 is removed through a sample conduit 32 which communicates with the inlet of an analyzer 33. A signal is also applied to the inlet of analyzer 33 which is representative of the composition of the material in column 10 adjacent the region from which the sample stream is withdrawn. This second measurement signal can be a signal representative of the temperature in the column, for example, as indicated by a temperature sensing device 34. The output signal of controller 35 is employed to reset flow controller 16 and/or flow controller 26 in such a fashion as to maintain the composition of the sample material withdrawn from column 10 at a predetermined value. This insures that the column is separating the fluid mixture in the desired manner.

Analyzer 33 is illustrated in detail in FIGURE 2. Sample conduit 32 communicates with the first port 40 of a multi-port rotatable sample valve 41. Valve 41 is provided with five additional ports 42, 43, 44, 45 and 46.

Ports 40 and 42 are in communication with one another; ports 43 and 44 are in communication with one another; and ports 45 and 46 are in communication with one another. When valve 41 is in the position illustrated, port 42 is in communication with a vent conduit 47, a conduit 48 communicates between ports 43 and 46, and a carrier gas is introduced into the system through a conduit 49 which communicates with port 44. Port 45 communicates with a conduit 50 which in turn communicates with the inlet of a chromatographic column 51. A vent conduit 52 communicates with the second end of a column 51. Valve 41 is adapted to be rotated 60° in a clockwise direction when a solenoid 53 is energized. A spring 54 returns the valve to the position illustrated when solenoid 53 is deenergized.

Column 51 can be filled with an adsorption material, such as a molecular sieve material comprising a dehydrated zeolite, silica gel, activated charcoal or alumina, or with a partition material such as an inert crushed solid coated by a solvent such as hexadecane or benzyl ether, for example. Any material which selectively retards passage of constituents of the fluid mixture to be analyzed can be employed as the packing material in this column. Examples of carrier gas which can be employed include helium, carbon dioxide, nitrogen, argon, air and steam. The particular carrier gas employed and the particular packing material in column 51 depend to a large extent upon the composition of the sample material to be analyzed.

A reference cell 56 is disposed in conduit 49 and a detector cell 57 is disposed in conduit 52. These cells contain respective thermistors 56' and 57' which are positioned in thermal contact with the fluids flowing through respective conduits 49 and 52. Thermistors 56' and 57' are connected in a modified form of Wheatstone bridge 58 which compares the thermal conductivities of the fluid flowing through conduits 49 and 52. First terminals of thermistors 56' and 57' are connected to one another and to the first terminal of a voltage source 59. The second terminals of thermistors 56' and 57' are connected to the respective end terminals of a potentiometer 60 through respective resistors 61 and 62. The contactor of potentiometer 60 is connected to the second terminal of voltage source 59. The junction between thermistor 56' and resistor 61 is connected to ground, and the junction between thermistor 57' and resistor 62 is connected to terminals 63 and 64 which are adapted to be engaged by respective switches 65 and 66. Terminals 63 and 64, taken with respect to ground, thus represent the output of bridge network 58.

When valve 41 is in the position illustrated, the sample stream from column 10 of FIGURE 1 is vented through conduit 47. The carrier gas passes through conduit 48 and column 51. Since the same gas flows through cells 56 and 57, the output signal of bridge network 58 is zero when the bridge is balanced initially. When it is desired to analyze a sample of the material removed from colunm 10, valve 41 is first rotated clockwise 60°. This results in the sample flowing through conduit 48 to vent conduit 47. The carrier gas is passed directly to column 51 at this time. Valve 41 is then rotated back to the position illustrated so that the volume of sample material trapped in conduit 48 is forced into column 51 by the carrier gas. The individual constituents of this sample material appear later in the column effluent so that the bridge network is unbalanced by amounts representative of the concentrations of the several constituents of the sample mixture.

Solenoid 53 is energized at predetermined time intervals by means of a timer which is actuated by a constant speed motor 70. The drive shaft 71 of motor 70 carries a plurality of cams 72, 73, 74, 75, 76 and 77 which are adapted to move respective switches 72a, 73a, 74a, 75a, 76a and 77a into engagement with respective contacts 72b, 73b, 74b, 75b, 76b and 77b. Contact 72b is connected to the first terminal of a voltage source 80, the second terminal of which is connected to ground. Switch 72a is connected to the first terminal of solenoid 53, the second terminal of which is connected to ground. Thus, valve 41 is actuated each time cam 72 moves switch 72a into engagement with terminal 72b.

Terminals 73b, 74b, 75b, 76b and 77b are connected to ground. Switches 75a and 76a are connected to the first terminals of respective relay coils 81 and 82 which close respective switches 65 and 66 when energized. The second terminals of relay coils 81 and 82 are connected to ground through respective voltage sources 83 and 84. Switches 75a and 76a are also connected to the first terminals of respective relay coils 87 and 88. The second terminals of relay coils 87 and 88 are connected to ground through respective capacitors 85 and 86. Relay coils 87 and 88 move respective switches 92 and 93 into engagement with respective terminals 94 and 95 when energized. Switches 92 and 93 are connected to ground. Terminals 94 and 95 are connected to respective terminals 96 and 97 which are adapted to be engaged selectively by a switch 98. Switch 98 engages terminal 97 when a relay coil 100 is energized and engages terminal 96 when relay coil 100 is deenergized. The first terminal of relay coil 100 is connected to switch 77a and the second terminal of relay coil 100 is connected to ground through a voltage source 101. Switch 98 is connected through a summing resistor 102 to the first input terminal of recorder-controller 35.

Switches 65 and 66 are connected through respective rectifiers 104 and 105 to respective terminals 96 and 97. Capacitors 106 and 107 are connected between terminals 96 and 97, respectively, and ground. The output signal of temperature sensing element 34 is applied to a transducer 108 which provides a voltage representative of the temperature of element 34. The first output terminal of transducer 108 is connected through capacitors 110 and 111 to respective terminals 112 and 113. A switch 114 engages terminal 113 when relay coil 100 is energized and engages terminal 112 when relay coil 100 is deenergized. Switch 114 is connected through a second summing resistor 115 to the second input of recorder-controller 35. Terminal 112 is connected to switch 74a, and terminal 113 is connected to switch 73a.

In order to describe the operation of the apparatus illustrated in FIGURE 2, it will be assumed that approximately ten minutes are required to make one complete analysis of a sample removed from column 10. It will further be assumed that the components of the fluid mixture to be detected appear in the effluent from column 51 during the period of from about 4.5 to 5.5 minutes after the beginning of the analysis cycle. At the beginning of the analysis cycle, time $t_0$ it is assumed that a sample of material leaves column 10 of FIGURE 1 and flows through conduit 32 toward analyzer 33. At this same time switch 73a is opened so that the right-hand plate of capacitor 111 is removed from ground. The right-hand plate of capacitor 111 starting from ground potential, develops a positive or negative charge which represents the change in the output signal from transducer 108 after switch 73a is opened. The charge on the right-hand plate of capacitor 111 is thus representative of any temperature changes within column 10 adjacent element 34 after time $t_0$. At time $t_2$ (the subscript "2" denotes 2 minutes after the start of the analysis cycle) the sample initially removed from column 10 arrives at valve 41. This assumes the sample conduit introduces a two minute time lag. Switch 72a is then closed so that valve 41 is rotated clockwise to permit the sample to flow through conduit 48. A few seconds later switch 72a is again opened to deenergize solenoid 53 so that the sample trapped in conduit 48 is transmitted to column 51 by the carrier gas. At time $t_{4.5}$, which is just before the component of interest appears in the effluent from column 51, switch 76a closes so that relay coil 88 is energized momentarily when capacitor 86 is grounded. This results in capacitor 107 being discharged. Relay coil 82 is energized when switch 76a is closed so that switch 66 is closed and the output signal from bridge network 58 is applied through rectifier 105 to charge capacitor 107. Rectifier 105 and capacitor 107 thus constitute a peak reading and clamping circuit so that capacitor 107 is charged to a potential representative of the maximum value of the output signal from bridge 58. This represents the concentration of one of the components in the fluid mixture to be detected.

At time $t_{5.5}$, switch 76a opens so that relay coil 82 is deenergized and switch 66 is opened. Switch 77a is closed at this time so that relay coil 100 is energized. This moves switches 98 and 114 into engagement with respective terminals 97 and 113 so that the right-hand plate of capacitor 111 and the non-grounded plate of capacitor 107 are connected through respective isolating resistors 115 and 102 to the input of controller 35. Resistors 115 and 102 form summing resistors in the input circuit of the controller so that the output signal of the controller is representative of the sum of the two input voltages.

The voltage applied from capacitor 107 is representative of the composition of the sample removed from column 10. If this composition has not changed during the time of analysis, a zero voltage is applied to controller 35 from capacitor 111. However, if there has been a temperature change in the column during the analysis time, the potential applied from capacitor 111 is representative of this change. This compensates the output signal from the chromatographic column for changes which have occurred during the actual analysis cycle. At time $t_6$, capacitor 110 is grounded by switch 74a being closed.

The second half of the analyzer timing cycle is substantially the same as that previously described except that the opposite part of the controller circuit shown in FIGURE 2 is employed. At the time $t_{10}$, a second sample leaves column 10. At the same time, switch 74a disconnects the right-hand side of capacitor 110 from ground. The second sample reaches valve 41 at time $t_{12}$. Switch 72 is closed for a short time at time $t_{12}$ so that the second sample is introduced into column 51. At time $t_{14.5}$, switch 75 closes to energize relay 81 and to energize relay 87 momentarily. This results in the output signal from the bridge network being applied to capacitor 106. Switch 75 opens at time $t_{15.5}$. Switch 77a again opens at time $t_{15.5}$ so that switches 98 and 114 engage respective contacts 96 and 112. Controller 35 thus receives the voltages from capacitors 106 and 110. Capacitor 111 is grounded by switch 73a being closed at time $t_{16}$.

Cathode follower circuits may be used to reduce the rate at which current is drained from capacitors 106, 107, 110 and 111 by input resistors 102 and 115. Cathode follower circuits are well known to those versed in the art, and are omitted from FIGURE 2 for the sake of clarity.

Figure 3:
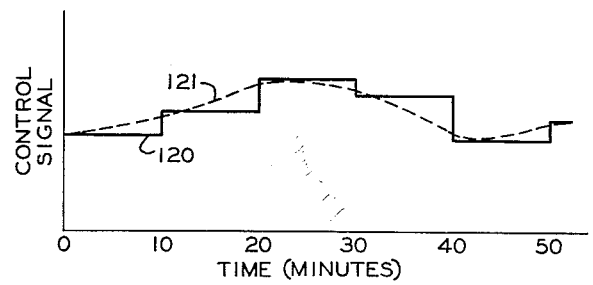
FIGURE 3 is a graphical representation of an operating feature of the control system of FIGURE 2.

The improved operation of the controller thus far described should become apparent from the curves of FIGURE 3. The solid curve 120 represents a typical output signal from the chromatographic analyzer which periodically analyzes sample streams. If this analyzer were employed in conjunction with a clamping circuit, the output signal applied to the controller would fluctuate abruptly at the end of each 10 minute period if the composition of the sample streams removed from column 10 fluctuated. This would result in a stairstep type of control signal which obviously is undesirable for control purposes. However, the modified circuit of the present invention provides a means for adjusting the output signal of the chromatographic analyzer to compensate for changes which might occur between the time the sample is removed from the column and the analysis signal is available. This modifying signal is provided by transducer 108 so that the composite signal applied to controller 35 is of the form shown by dotted curve 121. It should be evident that this curve is much more desirable for control purposes.

In the example previously described, capacitor 110 exercises the sole control from time $t_0$ to time $t_{5.5}$. Any change in temperature in column 10 results in a change in the output control signal. The transition at time $t_{5.5}$ is smooth because capacitor 111 has accumulated a charge representative of any changes in temperature during the time $t_0$ to $t_{5.5}$. This accumulated charge modifies the analyzer signal so as to compensate for changes which may occur during the "dead-time" of the chromatographic analyzer.

As a specific example of the control system of this invention, reference is made to a separation of hydrocarbons having four and five carbon atoms per molecules as are commonly found in straight run and natural gasolines. Column 10 contains 50 bubble cap trays and is 8½ feet in diameter by 112 feet high. Typical operating conditions and stream compositions are:

|  | Flow, Bbl./hr. | Temp., °F. | Press., p.s.i.g. | Normal Butane | Iso-pentane | Normal Pentane | Cyclo-pentane |
|---|---|---|---|---|---|---|---|
| Overhead product | 35 | 144 | 30 | 0.2 | 95.5 | 4.3 | 0.0 |
| Reflux | 500 | 102 |  | 0.2 | 95.5 | 4.3 | 0.0 |
| Feed, 24th tray from top | 75 | 154 |  | 0.1 | 49.0 | 50.4 | 0.5 |
| Kettle product | 40 | 166 | 35 | 0.0 | 8.0 | 91.1 | 0.9 |
| Reboiler steam, 20,000 lb./hr. at 40 p.s.i.g. |  |  |  |  |  |  |  |
| Internal reflux to feed ratio, 7.4/1. |  |  |  |  |  |  |  |
| Isopentane recovery, 91%. |  |  |  |  |  |  |  |

Since isopentane has a higher refinery value than normal pentane, the column is operated primarily for isopentane recovery. The amount of isopentane recovered is determined to a large extent by economic and physical considerations of the refinery as a whole.

Sample conduit 32 communicates with the 9th tray from the top and detector 34 is located at the 14th tray. If the measured isopentane concentration should decrease, the control system functions to decrease the heat supplied to the column so that less of the higher boiling constituents are vaporized. If the measured concentration of isopentane should increase, more heat is added to the column. In a similar fashion, temperature detector 34 acting through analyzer 33 and controller 35 tends to control the heat addition to maintain a constant temperature in the upper region of the column. It should be evident that analyzer 33 can measure other constituents in the sample and likewise control the column operation. The timer in the analyzer must be adjusted so that the output signal of the analyzer is released at the time the selected constituent is measured. It should also be evident that other process variables, reflux, for example, can be varied in response to the analyzer to obtain the desired control. Furthermore, other types of analyzers producing an intermittent output signal, certain types of mass spectrometers, for example, can be employed in place of the chromatographic analyzer.

Figure 4:
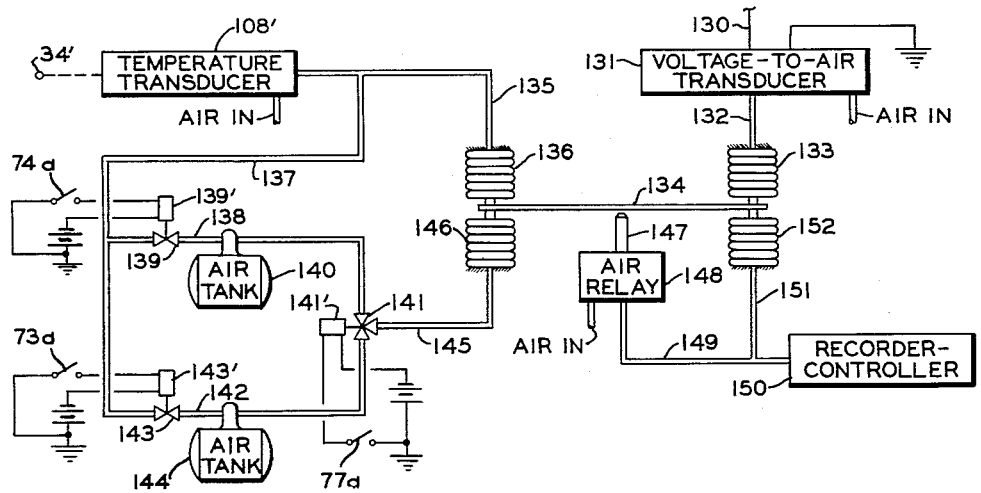
FIGURE 4 is a second embodiment of the control system of this invention.

In FIGURE 4 of the drawing there is shown a modified form of the controller of this invention which utilizes pneumatic rather than electrical signals for control purposes. Electrical lead 130 of FIGURE 4 is connected to switch 98 of FIGURE 2. This lead is connected to the first terminal of a conventional voltage-to-air transducer 131, the second input terminal of which is connected to ground. This transducer establishes an output pneumatic pressure representative of the electrical output signal of the chromatographic analyzer. This pressure is applied through a conduit 132 to a first bellows 133 which is fixed at its upper end. The second end of bellows 133 engages a movable plate 134.

The output signal of a temperature detecting element 34′ is applied through a transducer 108′ which establishes a pneumatic pressure that is representative of the temperature in column 10. This pneumatic pressure is applied through a conduit 135 to a second bellows 136 which is fixed at its upper end. Bellows 136 also engages plate 134. The output pressure of transducer 108′ is also applied through conduits 137 and 138, the latter having valve 139 therein, to an air tank 140. Air tank 140 is connected to the first inlet of a three-way valve 141. The pressure in conduit 137 is also supplied through a conduit 142, which has a control valve 143 therein, to a second air tank 144. Air tank 144 is connected to the second inlet of valve 141. The outlet of valve 141 is connected by a conduit 145 to a third bellows 146 which is fixed at its lower end. The upper end of bellows 146 engages plate 134 in opposition to bellows 136.

A nozzle 147 is positioned beneath plate 134 so that the positions of plate 134 in relation to the nozzle determine the amount of air that is free to leak out through the nozzle. Nozzle 147 is connected through an air relay 148 and a conduit 149 to a recorder-controller 150. Conduit 149 is also connected by a conduit 151 to a fourth bellows 152 which is fixed at its lower end. The upper end of bellows 152 engages plate 134 in opposition to bellows 133.

Air tanks 140 and 144 correspond generally to capacitors 110 and 111, respectively, in the electrical circuit of FIGURE 2. These air tanks receive the pressure from transducer 108′ when respective valves 139 and 143 are opened. At time $t_o$, switch 73a closes valve 143, thus locking air pressure in tank 144. At time $t_{5.5}$, switch 77a energizes 3-way solenoid valve 141 to connect conduit 142 to conduit 145. This applies air pressure from tank 144 to bellows 146. At time $t_6$ switch 74a opens valve 139, admitting air pressure from transducer 108′ to tank 140. In the second half of the cycle at time $t_{10}$, switch 74a closes valve 139. At time $t_{15.5}$ switch 77a deenergizes 3-way solenoid valve 141 to connect conduit 138 to conduit 145 and apply the air pressure in tank 140 to bellows 146. At time $t_{16}$, switch 73a opens valve 143. The balance of the operations during the analysis cycle are the same as described in the electrical controller embodiment of this invention.

The four bellows of FIGURE 4 constitute a summing relay so that the output pressure in bellows 152 is equal to the sum of the pressures in bellows 133 and 136 minus the pressure in bellows 146. The pressure in bellows 152, which is the output pressure of the analysis instrument, is applied to controller 150 in a manner corresponding to the sum of the voltages being applied to controller 35 of FIGURE 2.

Figure 5:
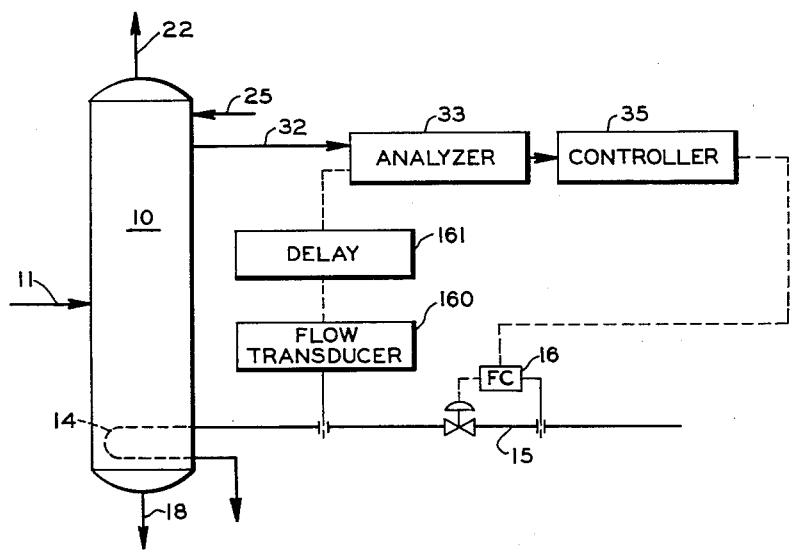
FIGURE 5 is a schematic representation of a third embodiment of the control system of this invention.

While transducers 108 and 108′ have been described as being temperature responsive, it should be evident that other types of continuous analyzers can be employed for this purpose. For example, a continuous reading differential refractometer can be employed in some systems to provide this second control signal. In some applications, it may not be possible to install a second analyzer which is capable of establishing a second signal that correlates with the sample composition. Apparatus of the form illustrated in FIGURE 5 can be employed in such a situation. In FIGURE 5, the output signal from controller 35 is employed to reset flow controller 16 to provide the basic control feature. A flow transducer 160 is provided to establish a signal which is representative of the flow of heating material through conduit 15. This signal is in turn employed as the second input signal to analyzer 33. However, it should be evident that there is a time lag between a change in flow of the heating material and the corresponding effect at the region in column 10 adjacent sample conduit 32, which requires that a predetermined amount of delay be incorporated in the second control signal. This is accomplished by a suitable delay means 161. If the delay time is relatively short and if electrical signals are employed, an electrical delay line utilizing resistors and capacitors can be employed for this purpose. If a longer delay is required, an electrical signal can be stored on a tape or other storage means and be reproduced at a predetermined later time. Another type of delay means can comprise a block of metal which is heated at one end in accordance with the flow through conduit 15. The temperature at the second end of the block follows the temperature of the first end with a suitable delay incorporated therein. A thermocouple is connected to the second end of the block. A pneumatic delay means, where the delay is provided by a series of air tanks and restrictions, can also be used. Regardless of the specific delay means employed, the delayed signal should change with respect to time in the same manner as the product composition changes. This refers to product composition change at the sampling point in response to a change in process input variable, steam flow rate, for example.

While the invention has been described in conjunction with present preferred embodiments, it should be evident that it is not limited thereto.

What is claimed is:

1. In a fluid mixture separation system wherein a fluid mixture to be separated is introduced into a separation column having first and second ends, a first product stream is withdrawn from said first end of said column, and a second product stream is withdrawn from said second end of said column; a control system comprising an analyzer adapted to provide a first signal representative of the composition of a sample supplied thereto at a predetermined time interval following introduction of the sample to the analyzer, conduit means communicating between said column and said analyzer to direct samples of fluid from said column to said analyzer, valve means in said conduit means, timing means to actuate said valve means periodically to open said valve means to permit flow of fluid through said conduit means, signal storage means actuated by said first signal, means to establish a second signal continuously representative of the degree of separation of the fluid mixture within said column, means to establish a third signal representative of changes in said second signal over a predetermined time interval, means to sum said first and third signals, and means responsive to said means to sum to control the operation of said column to maintain a predetermined degree of separation of the fluid mixture supplied thereto.

2. The apparatus of claim 1 wherein said means to control comprises means to control the rate at which heat is supplied to said column so as to maintain the composition of said sample at a preselected value.

3. In a fluid mixture separation system wherein a fluid mixture to be separated is introduced into a separation column having first and second ends, a first product stream is withdrawn from said first end of said column, and a second product stream is withdrawn from said second end of said column; a control system comprising an analyzer adapted to provide a first signal representative of the composition of a sample supplied thereto at a predetermined time interval following introduction of the sample to the analyzer, conduit means communicating between said column and said analyzer to direct samples of fluid from said column to said analyzer, valve means in said conduit means, timing means to actuate said valve means periodically to open said valve means to permit flow of fluid through said conduit means, signal storage means actuated by said first signal, means disposed in said column to establish a second signal continuously representative of the temperature within a predetermined region in the column, means to establish a third signal representative of changes in said second signal over a predetermined time interval, means to sum said first and third signals, and means responsive to said means to sum to control the operation of said column to maintain a predetermined degree of separation of the fluid mixture supplied thereto.

4. In a fluid mixture separation system wherein a fluid mixture to be separated is introduced into a separation column having first and second ends, a first product stream is withdrawn from said first end of said column, and a second product stream is withdrawn from said second end of said column; a control system comprising a chromatographic analyzer adapted to provide a first signal representative of the concentration of a component of a sample fluid mixture supplied thereto, conduit means communicating between said column and said analyzer to direct samples of fluid from said column to said analyzer, valve means in said conduit means, timing means to actuate said valve means periodically to open said valve means to permit flow of fluid through said conduit means, signal storage means actuated by said first signal, means to establish a second signal continuously representative of the composition of the fluid mixture within a preselected region of said column, means to establish a third signal representative of changes in said second signal over a predetermined time interval, means to sum said first and third signals, and means responsive to said means to sum to control the operation of said column to maintain a predetermined degree of separation of the fluid mixture supplied thereto.

5. In a fluid mixture separation system wherein a fluid mixture to be separated is introduced into a separation column having first and second ends a first product stream is withdrawn from said first end of said column, heat is supplied to the lower region of said column, and a second product stream is withdrawn from said second end of said column; a control system comprising an analyzer adapted to provide a first signal representative of the composition of a sample supplied thereto at a predetermined time interval following introduction of the sample to the analyzer, conduit means communicating between said column and said analyzer to direct samples of fluid from said column to said analyzer, valve means in said conduit means, timing means to actuate said valve means periodically to open said valve means to permit flow of fluid through said conduit means, signal storage means actuated by said first signal, means to establish a second signal continuously representative of the rate of heat addition to said column, means to establish a third signal representative of changes in said second signal over a predetermined time interval, means to sum said first and third signals, and means responsive to said means to sum to control the operation of said column to maintain a predetermined degree of separation of the fluid mixture supplied thereto.

6. In a fluid mixture separation system wherein a fluid mixture to be separated is introduced into a separation column, having first and seconds ends, a first product stream is withdrawn from said first end of said column, and a second product stream is withdrawn from said second end of said column; a control system comprising an analyzer adapted to provide a first signal representative of the composition of a sample mixture supplied thereto at a predetermined time interval following introduction of the sample to the analyzer, conduit means communicating between said column and said analyzer to direct samples of fluid from said column to said analyzer, valve means in said conduit means, timing means to actuate said valve means periodically to open said valve means to permit flow of fluid through said conduit means, first and second signal storage means, switching means to apply said first signal selectively to said first and second storage means, means to establish a continuous second signal representative of the composition of the fluid mixture within a preselected region of said column, third and fourth signal storage means, switching means to connect said third and fourth signal storage means selectively to said means to establish a second signal, means to sum signals, means to connect said first and third storage means simultaneously to said means to sum and to connect said second and fourth storage means simultaneously to said means to sum, and means responsive to said means to sum to control the operation of said column to maintain a predetermined degree of separation of the fluid mixture supplied thereto.

7. The apparatus of claim 6 wherein said analyzer establishes an electrical signal and wherein each of said first and second signal storage means comprises a capacitor, and a rectifier connected between said capacitor and said analyzer, whereby the charge accumulated on said capacitor represents the maximum amplitude of said electrical signal.

8. The apparatus of claim 7 wherein said means to establish a continuous signal comprises means to establish a first pneumatic pressure, said third and fourth storage means comprise respective tanks, means to establish a second pneumatic pressure representative of the charge on one of said capacitors, and wherein said means to control comprises means to establish an output pneumatic pressure representative of the difference between said first and second pressures.

9. The apparatus of claim 6 wherein each of said third and fourth signal storage means comprises a capacitor and wherein said means to establish a continuous signal comprises means to establish an electrical signal to charge said capacitors.

10. In a fluid mixture separation system wherein a fluid mixture to be separated is introduced into a separation column, having first and second ends, a first product stream is withdrawn from said first end of said column, and a second product stream is withdrawn from said second end of said column; a control system comprising an analyzer adapted to provide a first signal representative of the concentration of a component of a sample mixture supplied thereto at a predetermined time interval following introduction of the sample to the analyzer, first and second signal storage means, means to establish a second signal representative of the composition of the fluid mixture within a preselected region of said column, third and fourth signal storage means, first switching means to apply said first signal selectively to said first and second storage means, second switching means to apply said second signal selectively to said third and fourth storage means, first means to sum the signals on said first and third storage means, second means to sum the signals on said second and fourth storage means, means to control the operation of said column to maintain a predetermined degree of separation of the fluid mixture supplied thereto, and third switching means to apply said first and second means to sum selectively to said means to control to actuate same.

11. The apparatus of claim 10 wherein said means to control comprises means to control the rate at which heat is supplied to said column so as to maintain the concentration of the measured component constant in said sample mixture.

References Cited in the file of this patent

UNITED STATES PATENTS

| | | |
|---|---|---|
| 2,493,543 | Merchant | Jan. 3, 1950 |
| 2,530,828 | Leverenz | Nov. 21, 1950 |
| 2,709,678 | Berger | May 31, 1955 |
| 2,764,536 | Hutchins | Sept. 25, 1956 |

OTHER REFERENCES

Analyzing Hydrocarbon Mixtures, "The Oil and Gas Journal," April 16, 1956.

Gas Chromatography in Plant Streams, "ISA Journal," November 1956.

Gas Chromatography, "The Oil and Gas Journal," December 17, 1956.